United States Patent [19]
Le Blaye et al.

[11] Patent Number: 6,059,227
[45] Date of Patent: May 9, 2000

[54] DEVICE FOR ATTACHING AN ENGINE TO AN AIRCRAFT

[75] Inventors: Sébastien Le Blaye, Villaudric; Marc Canadas, Toulouse, both of France

[73] Assignee: Aerospatiale Societe Nationale Industrielle, France

[21] Appl. No.: 09/098,953

[22] Filed: Jun. 17, 1998

[30] Foreign Application Priority Data

Nov. 6, 1997 [FR] France .................................. 97 13966

[51] Int. Cl.[7] ................................................ B64D 27/00
[52] U.S. Cl. ............................................ 244/54; 248/554
[58] Field of Search ...................... 244/54; 248/554–557; 60/39.31

[56] References Cited

U.S. PATENT DOCUMENTS

| | | |
|---|---|---|
| 4,065,077 | 12/1977 | Brooks ....................................... 244/54 |
| 5,275,357 | 1/1994 | Seelen et al. . |
| 5,277,382 | 1/1994 | Seelen et al. ............................... 244/54 |
| 5,351,930 | 10/1994 | Gwinn et al. ............................. 248/557 |
| 5,620,154 | 4/1997 | Hey . |
| 5,871,177 | 2/1999 | Demouzon et al. ....................... 244/54 |
| 5,927,644 | 7/1999 | Ellis et al. ................................. 244/54 |

*Primary Examiner*—Galen L. Barefoot
*Attorney, Agent, or Firm*—Burns Doane Swecker & Mathis L.L.P.

[57] ABSTRACT

A device for attaching an engine to a strut (10) of an aircraft comprises a main attachment structure and an emergency or standby attachment structure (52). The main attachment structure includes a fitting (16) fixed to the strut (10), as well as at least two swivelled rods (18, 20) connecting the fitting (16) to the engine. The standby attachment structure (52), through which no force passes when the main attachment structure is operational, connects directly, with a clearance, the strut (10) to the engine. It e.g. comprises a yoke (54) integral with the strut (10) and passing through a window formed in the fitting (16), or a rod articulated to the engine and to the strut.

10 Claims, 3 Drawing Sheets

DEVICE FOR ATTACHING AN ENGINE TO AN AIRCRAFT

TECHNICAL FIELD

The invention relates to a device for attaching an engine beneath the wings or against the fuselage of an aircraft.

More specifically, the invention relates to an attachment device responsible for taking up lateral and vertical forces, as well as the engine torque, produced by the engine, in order to retransmit them to the aircraft.

PRIOR ART

Engines equipping aircraft are suspended or attached laterally to a strut fixed beneath the wings or to the fuselage of the aircraft.

The link between the engine and the strut is ensured by systems generally constituted by two or three complimentary attachment devices, fulfilling very different functions.

One of these attachment devices and which forms the object of the present invention, serves to take up lateral and vertical forces, as well as the engine torque, produced by the engine, in order to retransmit them to the aircraft via the strut. This attachment device can be fitted to the front or rear of the engine. The dimensions of the different parts are adapted as a consequence thereof.

As is more particularly illustrated by U.S. Pat. No. 5,620,154 and U.S. Pat. No. 5,275,357, certain of the existing attachment devices have a main attachment structure and a standby attachment structure. The main attachment structure transmits forces during normal operation, i.e. when all the parts of the attachment device are intact. The standby attachment structure is provided in order to ensure continuity of the force transmission function between engine and aircraft, so as not to lose the engine, in the case of a fracture of one of the parts of the main attachment structure.

In existing attachment devices, the main attachment structure normally comprises an intermediate fitting, fixed to the strut, e.g. by screws, as well as at least two swivelled rods, ensuring the connection between the fitting and the engine. The swivelling installation of the rods to the fitting and to the engine ensures that the device does not take up forces along the longitudinal axis of the engine.

As is also illustrated by the aforementioned documents, when existing attachment devices incorporate standby attachment structures, the latter include additional elements, such as one or more supplementary rods, interposed between the intermediate fitting and the engine. Normally, these additional elements do not take up forces when the parts of the main attachment structure are able to fulfil their functions. Consequently the additional elements have clearances such that they take up no force or load in normal operation.

However, in all existing attachment devices, the additional elements forming the standby attachment structure are always interposed between the intermediate fitting of the main attachment structure and the engine. Consequently a failure of said intermediate fitting is liable to prejudice the integrity of the entire attachment device, thus seriously affecting the safety of the aircraft.

DESCRIPTION OF THE INVENTION

The invention specifically relates to a device for attaching an engine to an aircraft strut, designed so as to maintain the integrity of the attachment of the engine, even in the case of the failure of the intermediate fitting of the main attachment structure.

According to the invention, this objective is achieved by means of a device for the attachment of an engine to an aircraft strut, having a main attachment structure including an intermediate fitting which can be fixed to the strut and at least two swivelled rods able to connect the fitting to the engine, as well as a standby attachment structure having a clearance such that it does not take up any forces in normal operation, said device being characterized in that the standby attachment structure is able to directly connect the strut to the engine without passing via the fitting.

Due to the fact that the standby attachment structure directly connects the strut to the engine without passing via the intermediate fitting, the integrity of the connection between the strut and the engine is preserved even in the case of a fracture of the intermediate fitting, no matter what the origin of said fracture (cracks, oxidation, material fault, etc.). The transmission of forces between the engine and aircraft is still assured and engine loss is avoided.

In a first, preferred embodiment of the invention, the standby attachment structure comprises two yokes which can be respectively connected to the engine and strut, as well as a pin connected to one of the yokes and having the aforementioned clearance with respect to the other yoke. The pin is then oriented substantially parallel to the longitudinal axis of the engine.

Preferably, the two yokes then comprise a female yoke and a male yoke and the pin is connected to the female yoke. The male yoke can then be integral with the strut and traverse the fitting without any contact therewith.

In the first, preferred embodiment of the invention, the fitting has a base fixable to the strut by dismantlable fixing means, such as screws, and end yokes to which are articulated the swivelled rods. The male yoke, integral with the strut, then traverses a window made in the fitting between the end yokes.

In a second, preferred embodiment of the invention, the standby attachment structure comprises a rod respectively articulatable to the strut and to the engine.

In this case, the standby attachment structure also incorporates a yoke which can be connected to the engine, and a first pin connected to the yoke in swivelling manner, traversing with said clearance a first end of the rod and oriented substantially parallel to a longitudinal axis of the engine.

The rod then traverses the fitting without any contact therewith and penetrates a slot in the strut, the standby attachment structure having at least one second pin connected to the strut and traversing a second end of the rod, parallel to the first pin.

As a function of the particular case, the standby attachment structure may have one or two second pins.

When a single second pin is provided, abutment surfaces are formed on the fitting in order to limit the pivoting of the rod about said second pin to a small, predetermined angle. When two second pins are provided, they are located substantially at the same distance from the first pin.

BRIEF DESCRIPTION OF THE DRAWINGS

The invention is described in greater detail hereinafter relative to non-limitative embodiments and the attached drawings, wherein show.

DETAILED DESCRIPTION OF PREFERRED EMBODIMENTS

Figure 1:
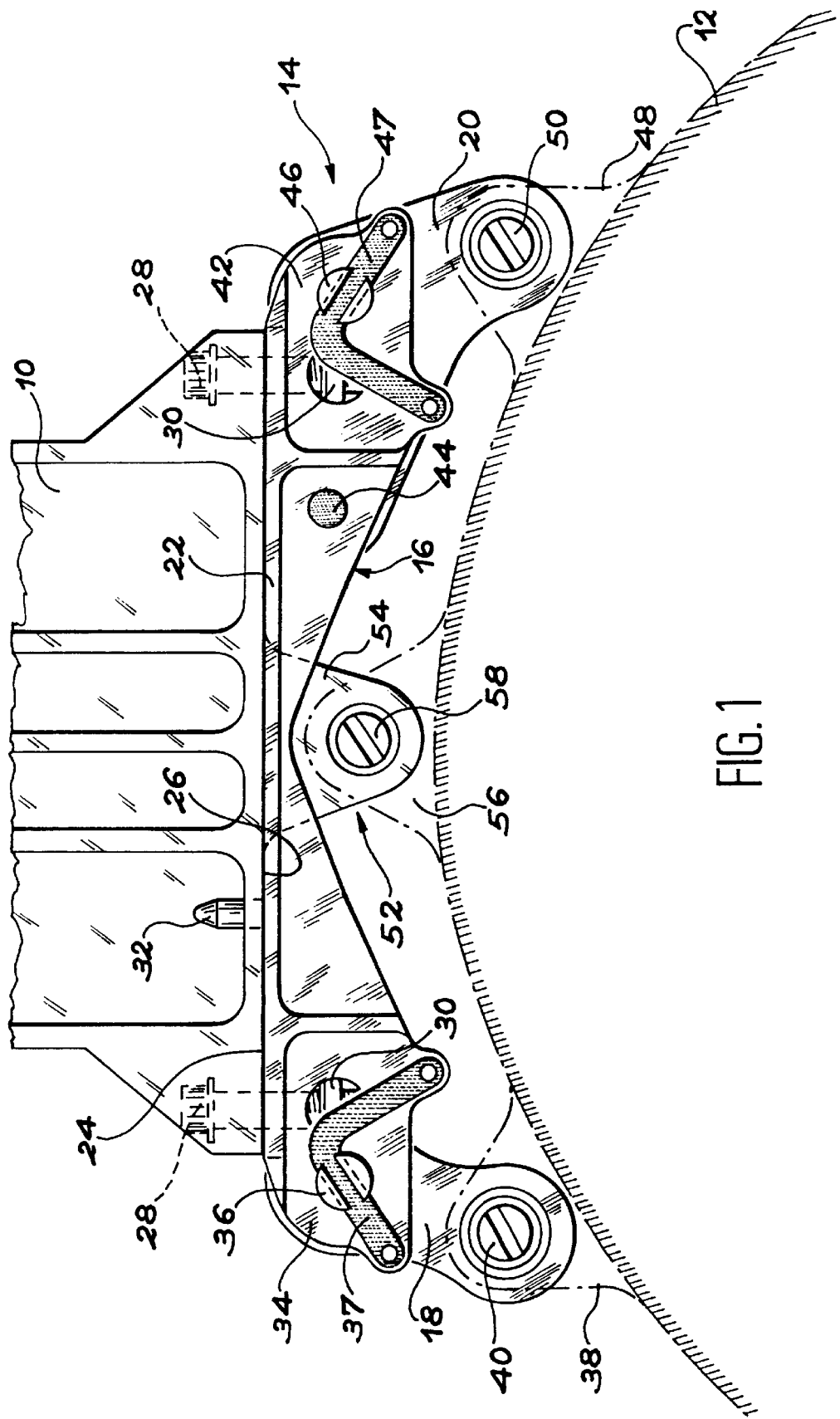
FIG. 1 A front view diagrammatically showing an attachment device according to a first embodiment of the invention.
Figure 2:
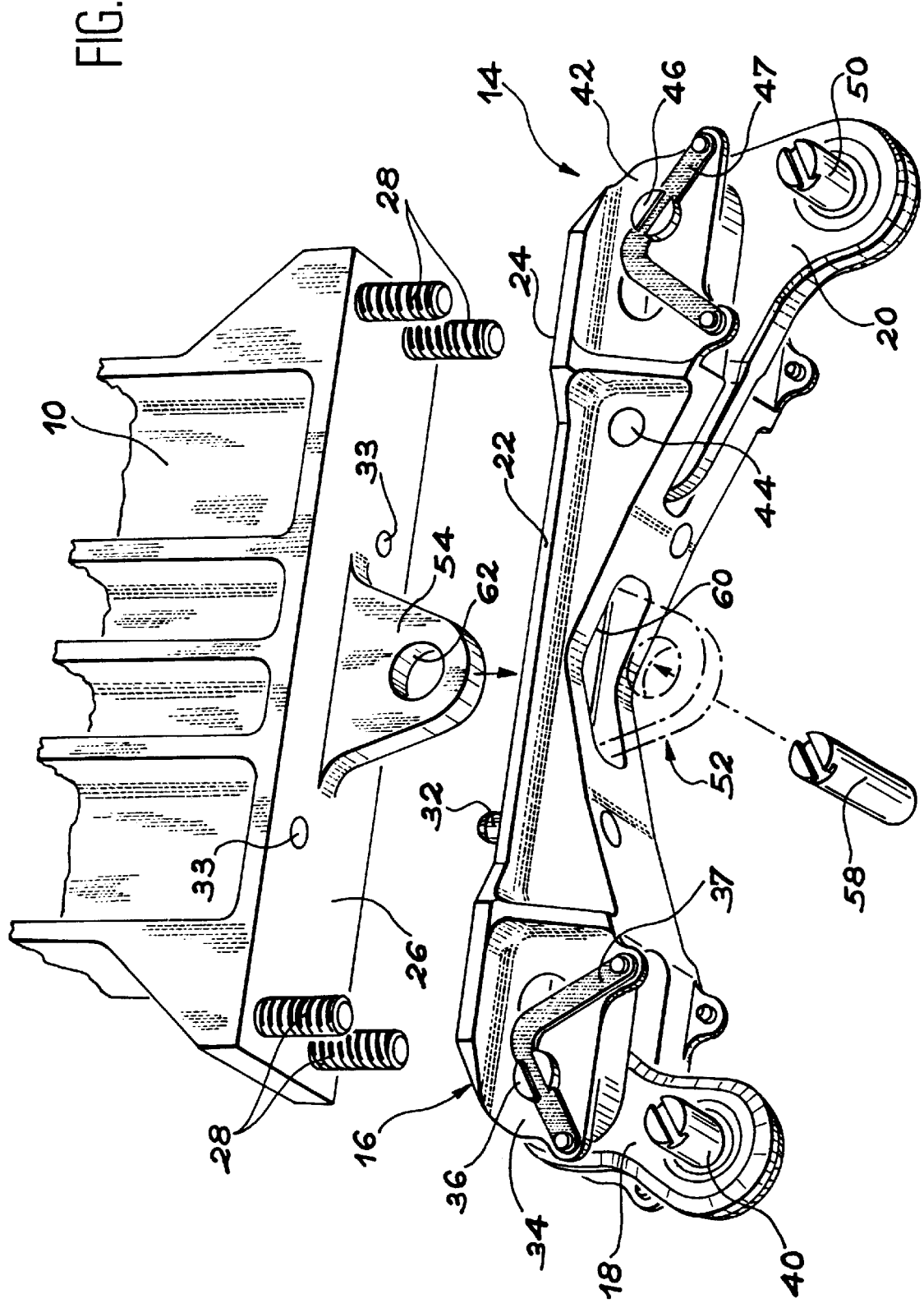
FIG. 2 An exploded perspective view illustrating the different parts of the attachment device of FIG. 1.

In FIGS. 1 and 2, reference 10 designates a strut to be fixed in known manner to an aircraft structure, such as the wings or fuselage. More specifically, reference 10 corresponds to that part of the strut designed for taking up the lateral and vertical forces, as well as the engine torque, produced by a not shown engine, so that said forces are retransmitted to the aircraft by means of the strut 10.

Reference 12 (FIG. 1) designates an part forming an integral part of the engine structure, or which is to be fixed to said structure according to known procedures not forming part of the invention. Only the portion of the part 12 adjacent to the strut 10 is illustrated, in mixed line form, in FIG. 1. As has already been stated, the part 12, by which the engine is attached to the strut 10, can be located to the front or rear of the engine.

The connection between the strut 10 and the part 12 is ensured by an attachment device 14 according to the invention. It is pointed out that the function of this attachment device 14 is to take up the lateral and vertical forces, as well as the engine torque, in order to retransmit them to the aircraft structure through the strut 10. All the other forces are transmitted by other, not shown attachment devices, which can be produced according to different known procedures and which do not form part of the present invention.

The attachment device 14 according to one embodimemt of the invention comprises a main attachment structure ensuring the transmission of all the aforementioned forces when the different parts constituting the same are undamaged, as well as an emergency or standby attachment structure for replacing the main attachment structure when any random one of its components is defective.

In the embodiment illustrated in FIGS. 1 and 2, the main attachment structure of the attachment device 14 incorporates a fitting 16, a single, lateral rod 18 and a lateral rod having three pins 20, known as a boomerang due to its special shape.

The intermediate fitting 16 has a base 22 having a planar face 24 for application to a planar face 26 of the strut 10. When the engine is attached under the aircraft wings, the planar face 26 of the strut 10 is turned downwards, as illustrated in FIG. 1.

The fitting 16 is fixed beneath the strut 10 by fixing means incorporating e.g. four screws 28, screwed into barrel or drum nuts 30 embedded in the intermediate fitting 16. More specifically, the screws 28 traverse facing holes machined in the strut 10 and in the fitting 16 and their heads bear against bearing surfaces provided on the strut 10, so as to engage the planar surfaces 24 and 26 with one another when screwed in the barrel or drum nuts 30. The fixing means constituted by the screws 28 and the nuts 30 work solely in tension.

The shear forces are also taken up by cylindrical fingers 32 forming an integral part of the base 22 of the intermediate fitting 16 and whereof only one is visible in the drawings. These cylindrical fingers 32 project over the planar face 24 of the base 22, so as to penetrate, virtually without clearance, holes 33 (FIG. 2) machined in facing manner in the planar face 26 of strut 10.

At a first end, the intermediate fitting 16 has a female yoke 34, in which is articulated in swivelling manner a first end of the single, lateral rod 18. This swivelling articulation is ensured by a pin 36 fitted in the female yoke 34 and carrying in its central portion a not shown ball joint housed in the corresponding end of the single rod 18. This type of assembly is well known in the art, so that a detailed description will not be given here.

The opposite end of the single, lateral rod 18 is also articulated by a swivelling link in a female yoke 38 (FIG. 1), which forms an integral part of the part 12. Only the pin 40 of said swivelling link is illustrated in the drawings.

At its opposite end, the intermediate fitting 16 comprises a second, female yoke 42, in which is received a branch of the lateral rod having three pins 20. More specifically, the lateral rod having three pins 20 is installed in the female yoke 42 by a swivelling link which includes two pins 44, 46 installed in the yoke 42, as well as not shown ball joints fitted in the branch in question of the rod 20 and placed on the central portion of each of the pins 44 and 46.

The end of the branch of the lateral rod having three pins 20 located at the end of the female yoke 42 cooperates with a female yoke 48 (FIG. 1) integral with the part 12, by a swivelling articulation, whereof only the pin 50 is illustrated in the drawings.

All of the pins 36, 40, 44, 46 and 50 are parallel to the longitudinal axis of the engine, which is oriented perpendicular to the plane of FIG. 1. These pins can be locked to female yokes 34, 38, 42 and 48, e.g. by pins, as illustrated at 37 and 47 in the drawings.

The assembly formed by the two lateral rods 18 and 20 makes it possible to lock the engine in rotation about its longitudinal axis and take up the vertical and lateral forces.

The main attachment structure described hereinbefore is of a known type and it can be replaced by any mechanically equivalent structure fulfilling the same functions in different forms, without passing beyond the scope of the invention.

The originality of the attachment device according to the invention is based on the design of the standby attachment structure, whereof a first, preferred embodiment is designated in general terms by the reference 52 in FIGS. 1 and 2.

Thus, according to the invention, the standby attachment structure 52 directly connects the strut 10 to the part 12, without passing via the fitting 16.

In the embodiment illustrated in FIGS. 1 and 2, the standby attachment structure 52 comprises a male yoke 54 forming an integral part of the strut 10, a female yoke 56 forming an integral part of the part 12, as well as a pin 58 traversing both the yokes 52 and 54.

More specifically, the male yoke 54 projects from the centre of the planar face 26 of the strut 10 and traverses with clearance a window 60 (FIG. 2) made in the central portion of the base 22 of the intermediate fitting 16.

When the part 12 is attached to the strut 10 by the aforementioned, main attachment structure, the male yoke 54 is received with clearance in the female yoke 56 of the part 12. The pin 58 is then fitted in the female yoke, so as to traverse with clearance a larger diameter hole 62 (FIG. 2) in the male yoke 54.

As a result of the arrangement described hereinbefore, in the standby attachment structure 52 there are adequate clearances for ensuring that the male yoke 54 is never in contact with the female yoke 56, with the pin 58 or any other element or component of the engine connected to the part 12, during the normal operation of the attachment device.

These clearances take account of expansion and movements of the engine with respect to the different fixing members.

In the case of a fracture of one of the two lateral rods 18, 20, one of the pins 36, 40, 44, 46 or 50, or one of the yokes 38 and 48 of part 12, the male yoke 54 automatically fulfills the attachment and force passage function with the still integral, lateral rod 18 or 20. The fitting 16 then continues to transmit forces to the strut 10, via screws 28.

In the case of the fracture of part of the fitting 16, the forces can transit via the lateral rods 18 and 20 and by the male yoke 54, the forces taking up in the fitting 16 still being retransmitted to the strut 10 by means of the screws 28.

Finally, in the case of a total failure of the fitting 16, which can e.g. result from poor mechanical characteristics or the like, the male yoke 54 is able to maintain the engine in position on the strut 10, as a result of a correct dimensioning, unlike in the case of known attachment devices, where a total failure of the fitting is synonymous with the loss of the engine.

Accordingly, the engine-aircraft link is maintained despite a fracture in the main attachment structure of the attachment device.

It should also be noted that the attachment device illustrated in FIGS. 1 and 2 is lighter than existing devices, because it permits a direct standby link between the strut 10 and part 12, unlike in existing devices, which make use of supplementary fittings, rods or pins.

Figure 3:
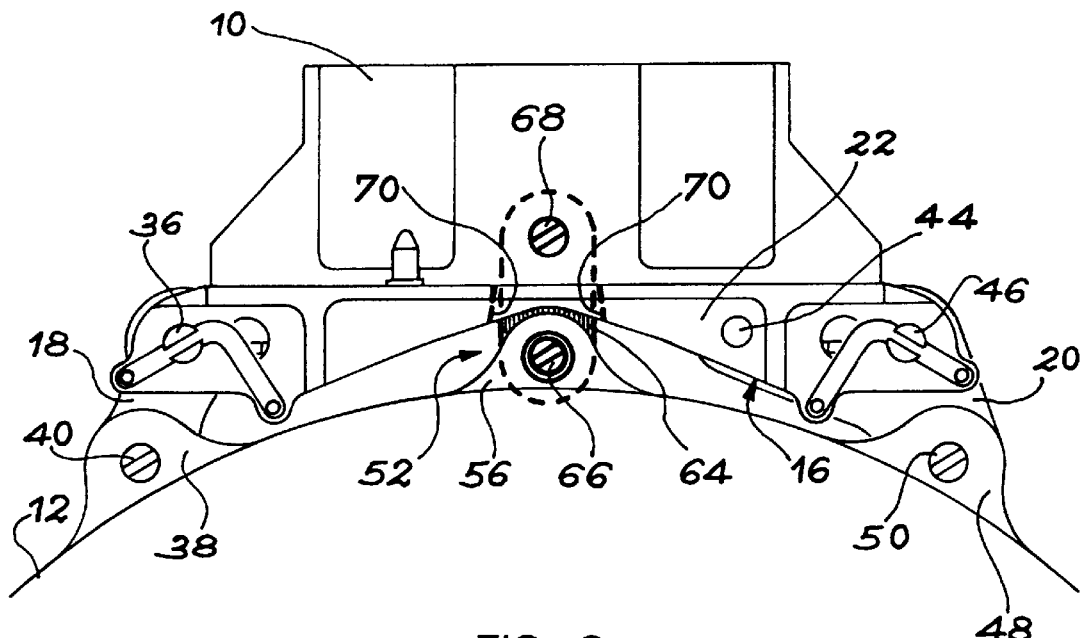
FIG. 3 A front view comparable to FIG. 1 diagrammatically illustrating a second embodiment of the invention.

With reference to FIG. 3, a description will now be given of a second embodiment of the attachment device according to the invention. As in the first embodiment described, the attachment device comprises a main attachment structure and a standby attachment structure, both interposed between the strut 10 and the part 12.

The main attachment structure illustrated in FIG. 3 is identical to that described hereinbefore with reference to FIGS. 1 and 2, so that it will not be described again. The same numerical references are used for designating the same parts. It should be noted that this structure can be replaced by any mechanically equivalent structure fulfilling the same functions, without passing beyond the scope of the invention. However, the standby attachment structure, still designated by the reference 52, has a different shape.

Thus, the standby attachment structure 52, in this case, comprises a rod 64 oriented substantially radially with respect to the axis of the engine. A first end of the rod 64 is articulated to the part 12 by a first pin 66 and a second end of the rod is articulated to the strut 10 by a second pin 68. The pins 66 and 68 are parallel to one another, as well as to the longitudinal axis of the engine.

More specifically, the standby attachment structure 52 comprises a female yoke 56 forming an integral part of the part 12 and which is midway between the yokes 38 and 48, as in the first embodiment described. The first, lower end of the rod 64 is received with clearance in the female yoke 56. The first pin 66 is fitted so as to swivel in the female yoke 56 and traverses with clearance a larger diameter hole formed in the rod 64.

The second, upper end of the rod 64 is received with clearance in a not shown slot made in the strut 10 and serving as the female yoke. The second pin 68 is installed in the strut 10, so as to traverse a hole having the same diameter and formed in the rod 64.

In its central portion, the rod 64 traverses with clearance a window made in the central portion of the base 22 of the intermediate fitting 16, comparable to the window 60 in FIG. 2. This window defines two abutment surfaces 70 against which can bear the rod 64, in the case where it pivots about the pin 68 by a predetermined, small angle.

When the main attachment structure is undamaged, the rod 64 is not functional. However, in the hypothesis of the fracture of any one of the parts constituted by the lateral rods 18, 20, pins 36, 40, 44, 46 and 50, yokes 38 and 48, fitting 16 or a portion thereof, the rod 64 becomes operational. It then automatically fulfils the attachment and force passage function, like the yokes 54 and 56 in the first embodiment described.

Compared with the first embodiment, the second embodiment illustrated in FIG. 3 has the advantage that the swivelled rod 64 is able to accommodate relative displacements between the strut 10 and the engine, e.g. due to vibrations or thermal expansion of the engine. The abutment surfaces 70 prevent a lateral, excessive, pendulous movement.

Figure 4:
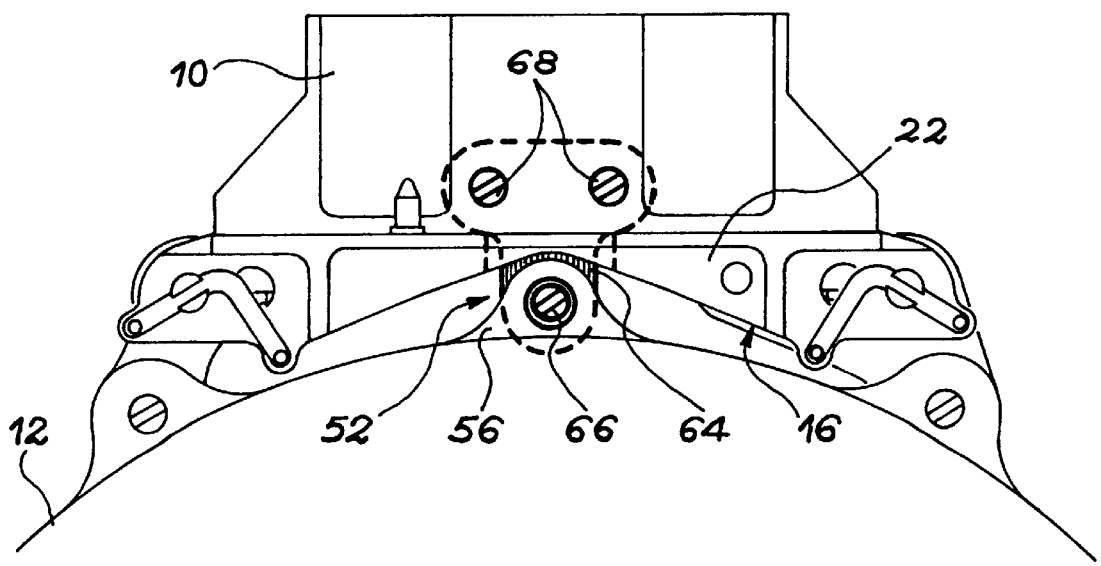
FIG. 4 A front view comparable to FIGS. 1 and 3 illustrating diagrammatically a variant of the second embodiment of the invention.

FIG. 4 shows a variant of the second embodiment of the invention, which differs from the latter solely through the shape of the rod 64 and by its attachment to the strut 10. All the other characteristics remain unchanged, so that a new description will not be given.

In this case, instead of being shaped like an I, the rod 64 is shaped like a T and is connected to the strut 10 by two second pins 68 instead of a single pin.

More specifically, the lower branch of the T formed by the rod 64 passes through a window made in the central portion of the base 22 of the fitting 16 and its end is articulated in swivelling manner, with clearance, on a female yoke 56 forming an integral part of the part 12, by means of a first pin 66, in the same way as in FIG. 3.

The second, upper end of the rod 64, forming the upper branch of the T, is received with clearance in a not shown slot made in the strut 10 and serving as the female yoke. The two second pins 68 are installed in the strut 10, so as to pass through holes having the same diameter formed in the ends of said upper branch. The two second pins 68 are located substantially at the same distance from the first pin 66, so as to form therewith, in front view, an isosceles triangle.

As hereinbefore, the clearances provided in the swivelling connection between the engine and rod 64 are such that the latter is not operational during the normal operation of the attachment device.

In the case of the previously envisaged failures for the embodiment of FIG. 3, the rod 64 becomes operational and automatically ensures the attachment and force passage function, in the same way as the yokes 54 and 56 in the first embodiment of the invention. The articulated rod 64 then makes it possible to withstand any relative displacements between the strut 10 and the engine, e.g. caused by thermal expansion of the engine.

The variant of FIG. 4 also has the advantage of limiting relative movements between the strut 10 and the engine, as a result of the two attachment points represented by the pins 68, when the said movements are of such an extent as to modify the attachment and force passage function. In other words, during excessive movements caused by the modification of the attachment function, the shape of the rod 64 limits the movement and deterioration of the attachment function is reduced. The abutment surfaces 70 (FIG. 3) are not then necessary.

The invention is not limited to the embodiments described specifically hereinbefore and covers all technical equivalents fulfilling the same functions, no matter what their forms or shapes. Thus, in the first embodiment, the male 54 and female 56 yokes can be reversed. In this case, the male yoke which is integral with the part 12 can penetrate a slot made in the strut 10 and which serves as the female yoke. The pin 58 then directly traverses the strut 10 to the right of said slot.

We claim:

1. A device for the attachment of an engine to an aircraft strut, the device comprising:

a main attachment structure including an intermediate fitting fixable to the aircraft strut;

at least two swivelled rods for connecting the intermediate fitting to the engine; and a standby attachment structure having a clearance such that the standby attachment structure does not take up any forces in normal operation, the standby attachment structure arranged to directly connect the aircraft strut to the engine without passing via the intermediate fitting.

2. A device according to claim 1, wherein the standby attachment structure comprises two yokes connectable to the aircraft strut and to the engine, and a pin connected to one of the yokes and having said clearance with respect to the other yoke, said pin being oriented substantially parallel to a longitudinal axis of the engine.

3. A device according to claim 2, wherein the two yokes comprise a female yoke and a male yoke, and the pin is connected to the female yoke.

4. A device according to claim 3, wherein the male yoke is integral with the aircraft strut and traverses the intermediate fitting without contacting said intermediate fitting.

5. A device according to claim 4, wherein the intermediate fitting includes a base fixable to the aircraft strut by dismantleable fixing means, and end yokes on which are articulated the swivelled rods, and wherein the male yoke is integral with the aircraft strut and traverses a window provided in the intermediate fitting between the end yokes.

6. A device according to claim 1, wherein the standby attachment structure comprises a rod articulatable to the strut and to the engine.

7. A device according to claim 6, wherein the standby attachment structure further comprises a yoke connectable to the engine, and a first pin connected to the yoke in a swivelling manner, the first pin traversing said clearance and a first end of the rod so that said first pin is oriented substantially parallel to a longitudinal axis of the engine.

8. A device according to claim 7, wherein the rod traverses the intermediate fitting without any contact therewith and penetrates a slot in the aircraft strut, the standby attachment structure having at least one second pin connected to the aircraft strut and traversing a second end of the rod, parallel to the first pin.

9. A device according to claim 8, wherein the standby attachment structure comprises a single second pin, and the intermediate fitting having abutment surfaces for limiting pivoting of the rod about said second pin to a predetermined, small angle.

10. A device according to claim 8, wherein the standby attachment structure comprises two second pins being substantially the same distance from the first pin.

* * * * *